United States Patent
Moughanni et al.

[11] Patent Number: 6,049,876
[45] Date of Patent: Apr. 11, 2000

[54] DATA PROCESSING SYSTEM AND METHOD WHICH DETECT UNAUTHORIZED MEMORY ACCESSES

[75] Inventors: Claude Moughanni, Haimhausen, Germany; William C. Moyer, Dripping Springs; Taimur Aslam, Austin, both of Tex.

[73] Assignee: Motorola, Inc., Schaumburg, Ill.

[21] Appl. No.: 09/032,015

[22] Filed: Feb. 9, 1998

[51] Int. Cl.[7] ................................................. G06F 12/14
[52] U.S. Cl. .......................................... 713/200; 711/163
[58] Field of Search ............................ 713/200; 711/100, 711/101, 102, 103, 104, 105, 163, 154

[56] References Cited

U.S. PATENT DOCUMENTS

| | | | |
|---|---|---|---|
| 5,396,609 | 3/1995 | Schmidt et al. | 711/163 |
| 5,465,341 | 11/1995 | Doi et al. | 714/30 |
| 5,500,949 | 3/1996 | Saito | 711/100 |
| 5,513,337 | 4/1996 | Gillespie et al. | 711/163 |
| 5,548,746 | 8/1996 | Carpenter et al. | 711/163 |
| 5,611,043 | 3/1997 | Even et al. | 714/38 |
| 5,619,671 | 4/1997 | Bryant et al. | 711/202 |
| 5,627,987 | 5/1997 | Nozue et al. | 711/200 |
| 5,628,023 | 5/1997 | Bryant et al. | 711/207 |
| 5,680,581 | 10/1997 | Banno et al. | 713/200 |
| 5,737,760 | 4/1998 | Grimmer, Jr. et al. | 713/200 |
| 5,881,276 | 3/1999 | Edrey | 712/234 |

OTHER PUBLICATIONS

Johnson, *MVS Concepts and Facilities*, Intertext Publications, McGraw-Hill Book Company, Chpt 1, Section 1.3, pp. 11–29, Copyright 1989.

*Primary Examiner*—Robert W. Beausoliel, Jr.
*Assistant Examiner*—Christopher A. Revak
*Attorney, Agent, or Firm*—Robert L. King

[57] ABSTRACT

A data processing system (10) which detects unauthorized memory accesses has trap door logic (17) that receives memory address bus (16) signals from a processor (12). The trap door logic (12) utilizes address detection logic (50, 52) to identify page numbers utilizing high order address bits and trap regions utilizing low order address bits. The resulting page number (70–76) signals and trap region (41–44) signals are selectively combined (54) to generate an exception signal (18) which is received by security logic (19). The selective combination (54) may be programmed, or may be fixed during fabrication. In response to the exception signal (18), the security logic (19) implements a predefined security policy, which is transmitted to the processor (12) over control lines (20).

15 Claims, 4 Drawing Sheets

DATA PROCESSING SYSTEM AND METHOD WHICH DETECT UNAUTHORIZED MEMORY ACCESSES

FIELD OF THE INVENTION

The present invention generally relates to data processors, and more specifically to data processing memory security systems.

BACKGROUND OF THE INVENTION

Security is an important issue within the development of integrated circuits. Components and information within these integrated circuits require some way to provide access protection to protect the integrity of these systems. A security system of some form is usually implemented to prevent unauthorized access to particular locations or components of these integrated circuits.

Several different methods have been used in the prior art to protect against unauthorized access to a system. One such methodology is the insertion of unimplemented op-code instructions in the application code. These are inserted in places in the code where the user is not expected to execute. When these op codes are executed, an illegal instruction exception is taken.

Another prior art methodology is to separate the memory space into sections that may be accessed, either read or written, by user program, and those that will cause an exception to occur when accessed. This latter methodology is a logical extension of the early multi-user/multi-programming techniques wherein multiple users were noted in a single memory space, and protections were put in place to prohibit the user from accessing the memory space of other users, or of the operating system itself.

These prior art methods have several disadvantages when used to protect against illegal access. One such problem is that hackers can overwrite these illegal OPcodes. Secondly, the prior art limits the illegal OPcode protection to program memory only. Thirdly, the number of regions that can be protected is by necessity small, since each such region typically requires a comparator. This becomes especially critical for lower cost applications where the cost of circuitry requires that the number of comparators be minimized. One disadvantage of having a small number of protected regions, is that it is relatively easy for a hacker to identify these regions and to program around them.

It would thus be advantageous to have a methodology that provides a large number of protected regions in a potentially non-uniform pattern through use of minimum circuitry to maintain minimum cost.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status. The terms "assert" a nd "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

A hierarchical access protection method is used that defines "trap doors" in user space. A trap door is a definable region in user space that a user is forbidden from accessing. Access by a user of such a trap door results in an exception. Exception handling is done according to a stated security policy. The location and number of trap doors is programmable by the supervisor software. In the preferred embodiment, supervisory accesses to the trap door code does not result in such an exception being invoked.

Figure 1:
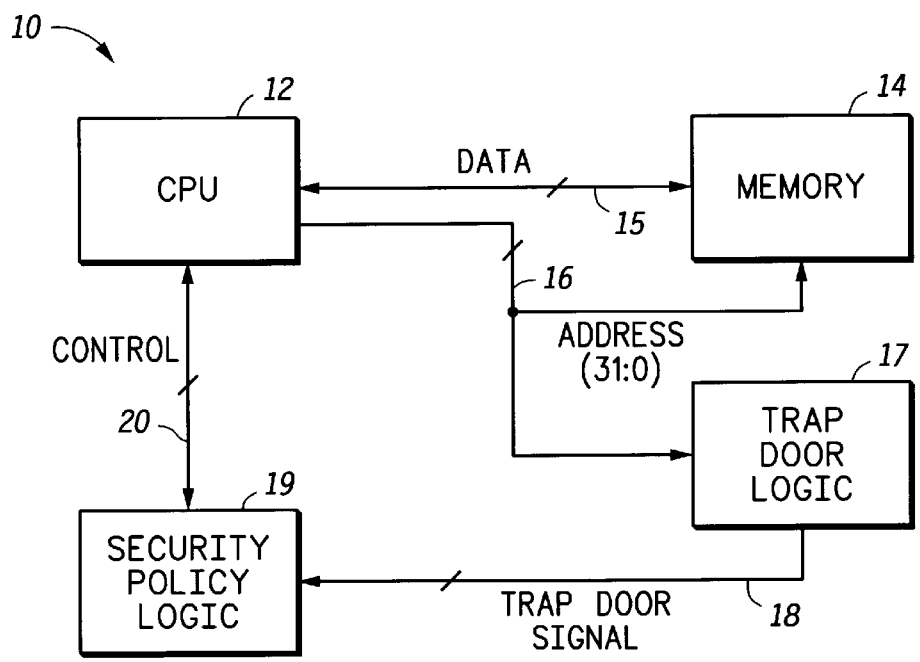
FIG. 1 is a block diagram illustrating a data processing system, in accordance with the present invention.

FIG. 1 is a block diagram illustrating a data processing system 10 that implements the present invention. The data processing system 10 has a processor or central processing unit (CPU) 12 that utilizes memory 14. The memory 14 may be RAM, ROM, FLASH, or a combination thereof. Access to the memory 14 is via a bidirectional data bus 15 and an address bus 16. In FIG. 1, the address bus 16 is shown as having 32 signal lines, resulting in a logical address space of $2^{32}$ bytes. Also receiving the 32 address bus 16 signals, is trap door logic 17. When the trap door logic 17 detects a security violation, through user access of trap door code in t he memory space, the trap door logic 17 generates a trap door exception signal 18. The trap door exception signal 18 is received b y security policy logic 19. The security policy logic 19 implements a security policy based on the access violation signaled by the trap door signal 18. One such security policy is to issue a reset signal over bidirectional control lines 20 to the CPU 12. Another such security policy is to selectively supply an over-voltage to the integrated circuit containing the processing system 10, effectively destroying the integrated circuit.

Figure 2:
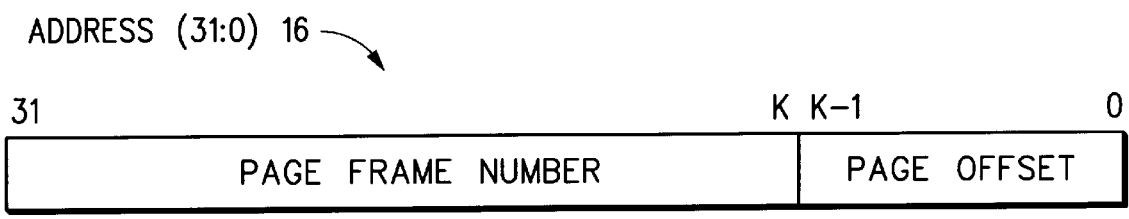
FIG. 2 is a diagram that illustrates separating the address bus bits into a page offset and a page frame number, in accordance with the present invention.

FIG. 2 is a diagram that illustrates separating the address bus 16 bits into a page offset field and a page frame number field. In FIG. 2, the low order "K" bits form a page offset field. For example, if K=10, the page offset addresses a single byte in a 1024 ($2^{10}$) byte page. The high order 32-K bits of the address bus 16 bits form a page frame number that potentially ranges from zero (0) to $2^{32-K}-1$.

Figure 3:
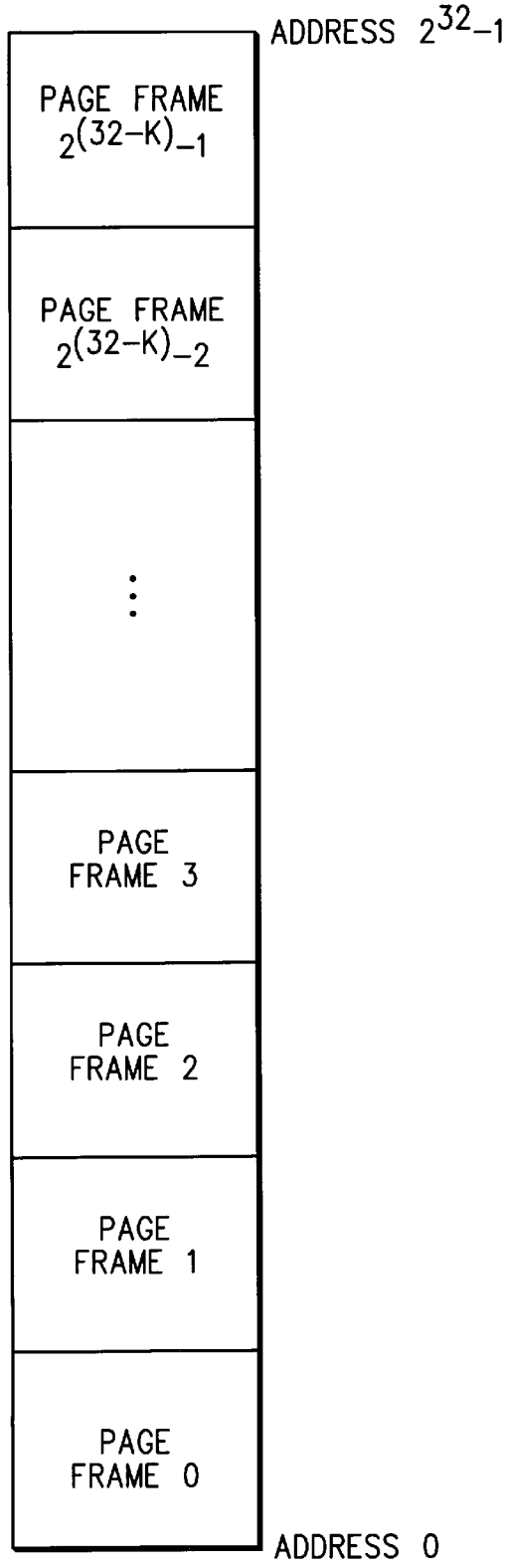
FIG. 3 is a diagram that illustrates the address space addressed by the address bus bits shown in FIG. 2.

FIG. 3 is a diagram that illustrates the address space addressed by the address bus 16 bits shown in FIG. 2. The address space has $2^{32}$ bytes of addressability, ranging from an address of zero (0) to an address of $2^{32}-1$. The address space is divided into page frames, each page frame being $2^K$ bytes long. There are thus $2^{32-K}$ page frames numbered from zero (0) to $2^{32-K}-1$.

Figure 4:
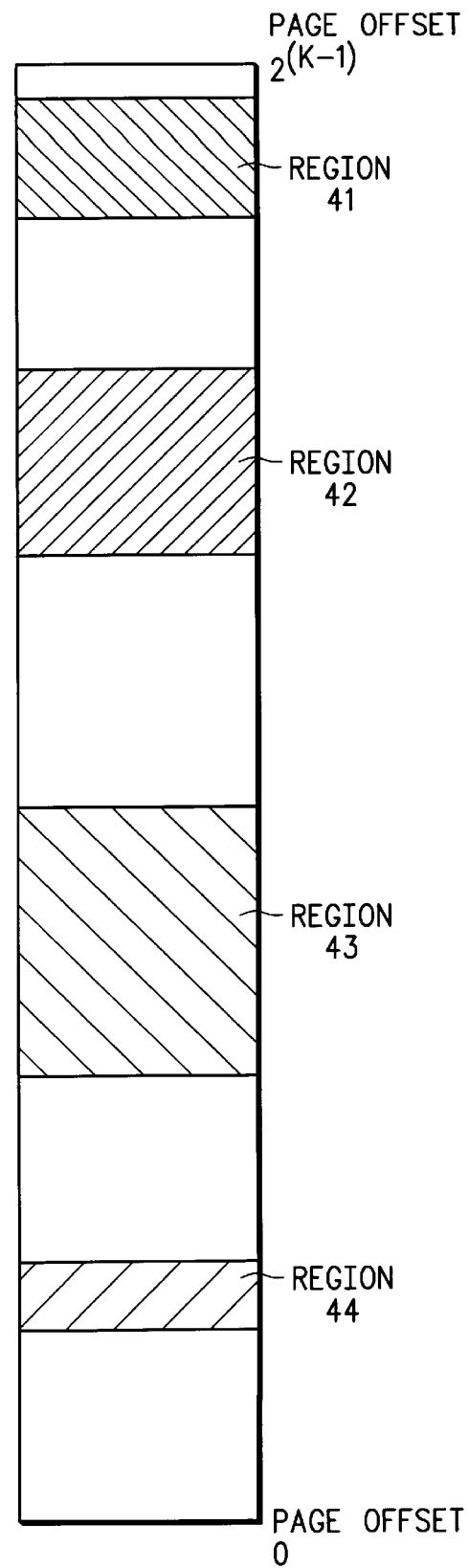
FIG. 4 is a diagram illustrating multiple trap regions in a single page in memory, in accordance with the present invention.

FIG. 4 is a diagram illustrating multiple trap regions in a single page frame of memory. Each such page frame contains $2^K$ bytes, with an address range of zero (0) to $2^K-1$. Thus, if K=10, the address range in the page is from 0–1023.

Four trap regions are shown in the page frame in FIG. 4. Region 41 is at the top followed by region 42, region 43, and region 44. There is white space between the regions 41–44 in FIG. 4 indicating memory that is not in a trap region 41–44. Different sizes of trap regions 41–44 are shown in FIG. 4. It should be noted here that the four regions 41–44 are shown to be non-overlapping in FIG. 4. However this is not a requirement of this invention, and indeed the architecture disclosed herein supports overlapping regions. It should also be noted here that four trap regions 41–44 are shown in FIG. 4. However, the present invention supports more, or fewer trap regions.

Figure 5:
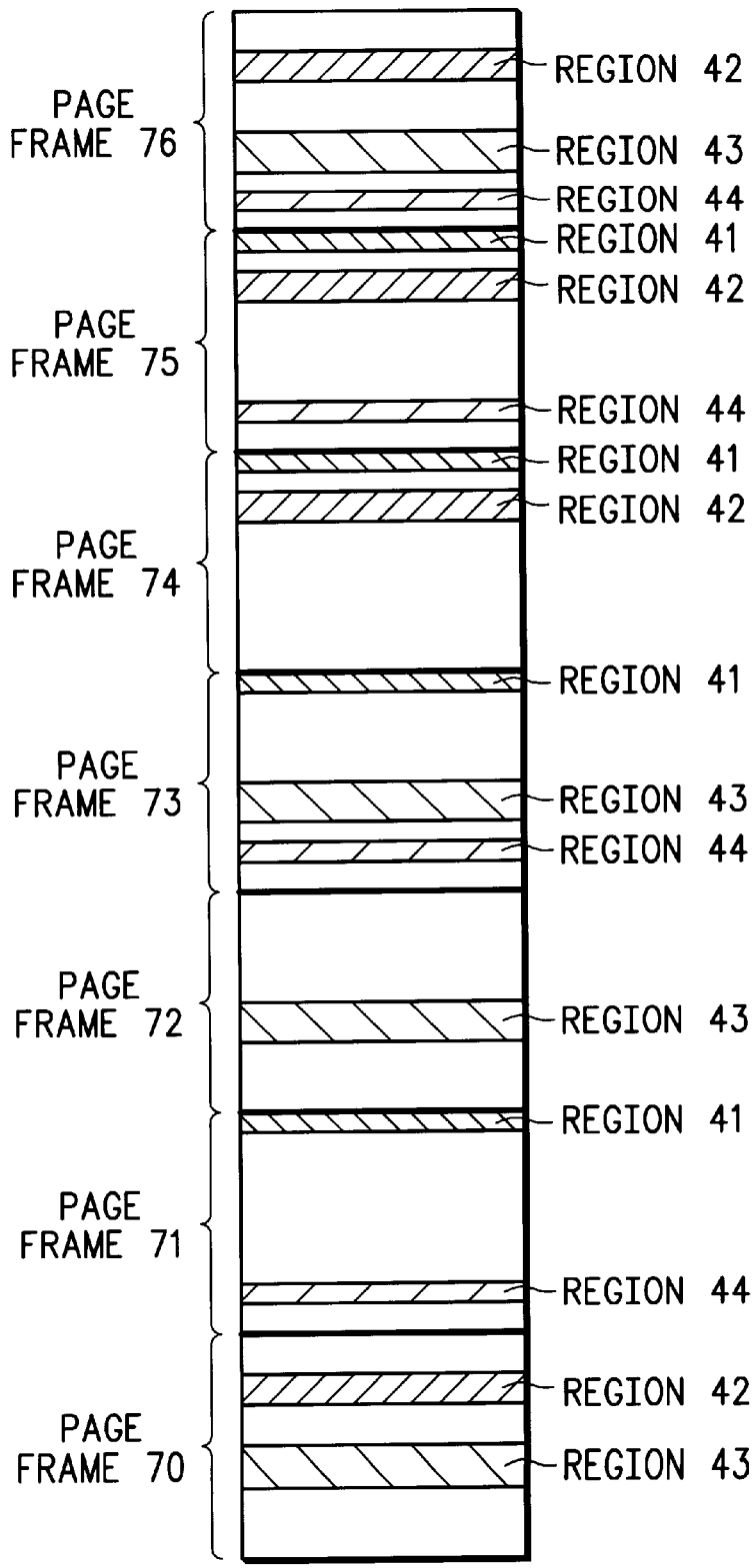
FIG. 5 is a memory map illustrating variable trap regions utilizing the trap regions shown in FIG. 4.

FIG. 5 is a memory map illustrating variable trap regions utilizing the trap regions 41, 42, 43, 44 shown in FIG. 4. Seven page frames are shown, ranging from page 70 to page 76. These seven page frames are identified by the high order 32-K bits in the address bus 16 bits. Each of these page frames contains each of the regions shown in FIG. 4. However, the regions in each page frame are selectively trap enabled on a page-by-page basis. Only trap enabled regions are shown in FIG. 5. Page 70 has trap region 42 and trap region 43 enabled. Thus, access to memory in either of these two trap regions 42, 43 in page 70 will cause a trap door exception signal 18 to be asserted. Access to the remainder of the page, including access to region 41, and region 44 will not cause the trap door exception signal 18 to be asserted. Similarly, page 71 has trap region 41 and trap region 44 enabled. Region page 72 has trap region 43 enabled. Page 73 has trap region 41, trap region 43, and trap region 44 enabled. Page 74 has trap region 41 and trap region 42 enabled. Page 75 has trap region 41, trap region 42, and trap region 44 enabled. Finally, page 76 has trap region 42, trap region 43, and trap region 44 enabled.

In order for a program to operate successfully in this environment, it must be compiled and linked with knowledge of the enabled trap regions in each of the page frames. The functional portions of the code are loaded in the areas of the page frames that do not include active trap regions. Due to the modular nature of much software these days, it is possible to load subroutines and sub-functions in these untrapped portions of memory, without the necessity of branching around the trapped portions of memory. The trapped portions of memory may be filled with anything, including actual code, since access to the trapped portions of memory causes the trap door exception signal 18 to be raised.

Figure 6:
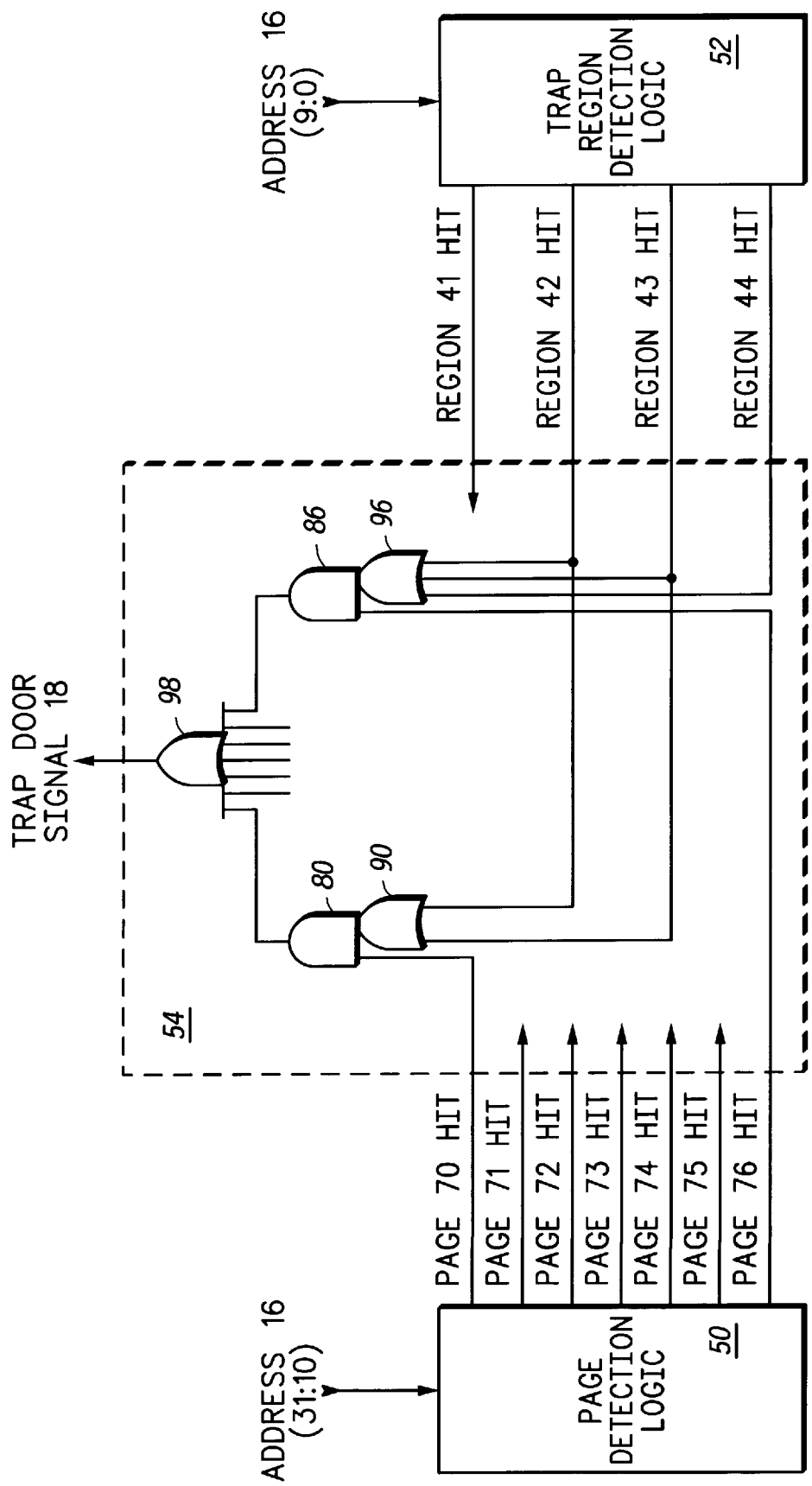
FIG. 6 is a block diagram of trap door logic shown in FIG. 1.

FIG. 6 is a block diagram of trap door logic 17 shown in FIG. 1. The trap door logic 17 receives the address bus 16 signals. The high order address bus 16 bits are routed to a page detection logic 50, while the low order address bus 16 bits are routed to a trap region detection logic 52. In FIG. 6, "K" is equal to 10, and thus the high order twenty-two (22) address bus 16 bits (31:10) designate the page frame number, and the low order ten (10) address bus 16 bits (9:0) indicate the page offset within page. Receiving the high order 32-K (31:K) address bus 16 bits, the page detection logic 50 generates a page 70 hit signal if the address is in page 70, a page 71 hit signal if the address is within page 71 . . . and a page #N hit signal if the address is in page #N. In FIG. 6, seven page hit signals are shown being generated by the page detection logic 50, corresponding to the seven pages 70–76 shown in FIG. 5.

The low order "K" address bus 16 signals are received by the trap region detection logic 52. The trap region detection logic 52 generates a region trap hit signal for each of the trap regions being monitored. In FIG. 6, a region 41 hit signal is generated if a memory address is detected in trap region 41. A region 42 hit signal is generated if a memory address is detected in region 42. A region 43 hit signal is generated if the address is detected in region 43. Finally, a region 44 hit signal is generated when an address is detected in region 44.

In the preferred embodiment, content address addressable memory (CAM) arrays are used in the implementation of the page detection logic 50 and the trap region detection logic 52. However, other page detection means 52 and trap region detection means 52 are also possible. For example, decoders may be used. Alternatively, each page detection hit signal may be generated by a single comparator testing the high order address lines for equality, and each trap region hit signal may be generated by ANDing two comparator signals for each address range, with one comparator detecting a low order address greater than a trap region lower bound, and the second comparator detecting a low order address less than a trap region upper bound.

The page hit signals and the region hit signals are selectively combined to generate the trap door exception signal 18 in connection logic 54. In FIG. 6, connection logic 54 is shown consisting of seven AND gates 80–86 corresponding to the seven page hit signals. A first AND gate 80 has as a first input the page 70 hit signal. A second input to the first AND gate 80 is from a first OR gate 90 that has two inputs: the region 42 hit signal and the region 43 hit signal generated by the trap region detection logic 52. Thus, AND gate 80 will generate a hit signal when the high order address bus 16 bits indicate that the address is in page 70, and the low order address bus 16 bits indicate that the address is in either trap region 42 and/or trap region 43. This corresponds to the two trap regions: 42 and 43 shown enabled for page 70 in FIG. 5. AND gates 81–85 and OR gates 91–95 corresponding to pages 71–75 are not shown. A seventh AND gate 86 has two inputs: the page 76 hit signal, and the output of a seventh OR gate 96. The seventh OR gate 96 has three inputs: the trap region 42 hit signal, the trap region 43 hit signal, and the trap region 44 hit signal. The seventh AND gate 86 will thus generate a hit signal when the high order address bus 16 bits indicate that the address is in page 76, and when the low order address bus 16 bits indicate that the low order address is in trap regions 42, 43, and/or 44. The seven AND gate 80–86 hit signals are combined with a high level OR gate 98 to generate the trap door exception signal 18. Thus when any of the seven AND gates 80–86 corresponding to the seven memory pages 70–76 generate a hit signal, the trap door exception signal 18 is asserted.

In FIG. 6, the connection logic 54 is shown consisting of AND gates 80–86, and OR gates 90–96. This logic will preferably be generated from a truth table or truth matrix using standard CAD tools to generate an optimized logic layout. An example of such a truth table for the memory shown in FIG. 5 is shown in Table T-1 below.

TABLE T-1

| | Trap Regions | | | |
|---|---|---|---|---|
| | #1(41) | #2(42) | #3(43) | #4(44) |
| Page #0 | 0 | 1 | 1 | 0 |
| Page #1 | 1 | 0 | 0 | 1 |
| Page #2 | 0 | 0 | 1 | 0 |
| Page #3 | 1 | 0 | 1 | 1 |
| Page #4 | 1 | 1 | 0 | 0 |
| Page #5 | 1 | 1 | 0 | 1 |
| Page #6 | 0 | 1 | 1 | 1 |

Programmable Logic Devices (PLDs), including Programmable Logic Arrays (PLAs), Programmable Array Logic (PAL) devices, and ROM, may also be used to implement the truth table logic.

It is expected however that in certain situations it may be desirable to make this logic programmable. This can be done by any mechanism that will generate either a 0 or 1 bit signal based on page hit signals in one dimension, and region hit signals in a second dimension. If there are M page hit signals and N region hit signals, one embodiment would utilize M×N AND gates, one for each potential combination of M pages and N regions bit signals. Each such AND gate has its inputs a single page hit signal, a single region hit signal, and a programmable bit indicating whether or not the designated region and the designated page is enabled for trapping. The M×N AND gates would be combined via an OR gate (or equivalent series of OR gates) to generate the trap door signal 18. Another embodiment would utilize a M×N input programmable decoder that generates the trap door signal 18 based on which page hit and region hit signals were being asserted.

Note that in the preferred embodiment, specified combinations of page hits and trap door hits affirmatively exclude access to selected trap door regions within page frames. However, this logic may be selectively reversed in the connection logic 54 for some or all of the either trap door regions and/or the page frames. For example, in some page frames, the trap door regions may allow access, instead of prohibit access in a prohibited page frame.

A two-level hierarchical access protection system has been shown in FIG. 6. Note however that more than two levels of hierarchical access protection are also within the scope of this invention. For example, the address bus 16 signals may be broken into three levels: a page set level with the high order address bits; a page within page set with the intermediate level address bits; and an address within page with the low order address bits. The connection logic 54 would be likewise modified to support the three levels of address bus 16 signals. For example, AND gates 80–86 would have an additional, intermediate level, input.

In the preferred embodiment disclosed above, the security policy logic 19 invokes a security policy when the trapped door exception signal 18 is asserted and the system is not in supervisory mode. However, in certain situations it may be advantageous to invoke a security policy even when the processor 12 is in supervisory state. One reason for this is that one of the more common methods of attacking a systems security is through gaining supervisory mode status. Thus, in an alternative embodiment, the security policy is invoked regardless of the supervisory state of the processor 12 upon assertion of a trap door exception signal.

A hierarchical access protection scheme provides additional security over the prior art. The address decoding process is decomposed into two or more disjoint pieces or sets. The results of this decoding are recombined with each disjoint set with one or more items in other sets. The recombination can be fixed in hardware, or may be programmable through software, hardware connections, or other non-volatile means. This provides significant security through extremely large commutation space at a cost of minimum logic, cost, empowered.

Those skilled in the art will recognize that modifications and variations can be made without departing from the spirit of the invention. Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A data processing system which detects an unauthorized memory access, comprising:

a processing unit for communicating data and address information which is processed;

a memory coupled to the processing unit for communicating data with the processing unit in response to receiving address information from the processing unit, the memory storing data in pages, one or more of said pages each having one or more predetermined address regions which if addressed cause an exception signal to be generated;

logic circuitry coupled to the processing unit for generating the exception signal, the logic circuitry receiving the address information and in response identifying: (1) whether the address information is addressing any of the pages having one or more predetermined address regions which cause an exception signal to be generated, and generating a first hit signal which identifies which page of the memory the address information corresponds to; (2) whether the address information is addressing any of the one or more predetermined address regions and generating a second hit signal which identifies, if any, of the one or more predetermined address regions the address information corresponds to; and (3) generating the exception signal in response to occurrence of both the first hit signal and the second hit signal; and security logic coupled to the logic circuitry for affecting what action the processor takes in response to the exception signal being provided.

2. The data processing system of claim 1 wherein the security logic comprises;

determining whether the exception signal should be acknowledged and providing the processing unit a control signal in response thereto, the control signal being used by the processing unit in response to detecting that an unauthorized memory access occurred.

3. The data processing system of claim 1 wherein each of the one or more predetermined regions has a size which is programmable by defining how many addresses for each of the one or more predetermined address regions may correspond to address information which is received.

4. The data processing system of claim 1 wherein the logic circuitry further comprises content addressable memory arrays, each having predetermined stored addresses for comparison with the address information which is received and generating either the first hit signal or the second hit signal when one of the predetermined stored addresses matches the address information.

5. The data processing system of claim 1 wherein the logic circuitry generates a plurality of second hit signals, each of the plurality of second hit signals corresponding to a predetermined one of one or more predetremined address regions, and the logic circuitry generates the exception signal upon detection of the first hit signal and a predetermined grouping of the plurality of second hit signals.

6. The data processing system of claim 1 wherein the address information comprises a plurality of individual addresses, each of the individual addresses having a first portion which defines a page number in the memory and having a second portion which defines an offset within the page number.

7. The data processing system of claim 2 wherein the processing unit provides the security logic a mode signal which indicates whether the data processing system is in a user mode or a supervisor mode of operation, the security logic acknowledging any exception signal generated by the logic circuitry when the data processing system is in the user mode, the processing unit taking action to prevent access to the memory upon receipt of the exception signal.

8. The data processing system of claim 1 wherein the address information which is received corresponds to either user program code which is stored in the memory or to user data which is stored in the memory.

9. In a data processing system having a processing unit which communicates data and address with a memory, a method for restricting access to predetermined portions of the memory by a user of the data processing system, comprising the steps of:

creating pages within the memory and for one or more of the pages, programming a plurality of predetermined address regions which have restricted user access;

analyzing address information communicated from the processing unit to the memory for purposes of accessing data stored in the memory, said analyzing comprising: (a) identifying whether the address information is addressing any pages having a plurality of predetermined address regions with restricted user access and generating a first hit signal in response thereto; (b) identifying whether the address information is addressing any of the plurality of predetermined address regions which have restricted user access and generating a second hit signal in response thereto; and (c) using the first hit signal and the second hit signal to selectively provide an exception signal; and using the exception signal to determine if the exception signal is further qualified, and if the exception signal is not further qualified, denying use of the memory.

10. The method of claim 9 wherein the step of creating pages within the memory in which for one or more of the pages the plurality of predetermined address regions having restricted user access is programmed, further comprises the step of:

programming a differing number of predetermined address regions for at least two different pages.

11. The method of claim 9 further comprising the step of using the exception signal to determine if the exception signal is further qualified by using a user/supervisor mode signal provided by the processing unit and, in response to detecting that a supervisor mode exists, disqualifying the exception signal to permit access to the one of the plurality of predetermined address regions with restricted user access which is being addressed.

12. The method of claim 9 further comprising the step of:

using one of a programmable logic array, a Read Only Memory (ROM), a decoding logic circuit or combinatorial logic to provide the exception signal.

13. The method of claim 9 further comprising the step of:

implementing the memory as one of a Flash memory, a Dynamic Random Access Memory (DRAM) or a Read Only Memory (ROM).

14. A data processor with a memory access control feature, comprising:

a processor which processes data and address information;

memory access circuitry coupled to the processor for receiving the address information, the memory access circuitry being configured to identify whether: (1) the address information is addressing any of a plurality of predetermined memory region addresses by comparing predetermined stored memory addresses with the received address information and generating a first hit signal in response to detecting a match thereof; and (2) whether the address information is addressing any of one or more of a plurality of predetermined restricted memory address sub-regions by comparing predetermined stored addresses of restricted memory regions with the received address information and generating a second hit signal in response to detecting a match thereof, the memory access circuitry using combinatorial logic to detect generation of the first hit signal and the second hit signal to provide an exception signal in response to identifying both a predetermined memory region address and a predetermined restricted memory address sub-region; and logic circuitry coupled to the memory access circuitry and the processor for affecting what action the processor takes in response to the exception signal being provided.

15. The data processor of claim 14 wherein the data processor provides a mode signal to the logic circuitry for defining whether the data processor is in a supervisor mode or a user mode, the data processor not restricting memory access when the exception signal is provided if the data processor is in the supervisor mode.

* * * * *